Figure 1:
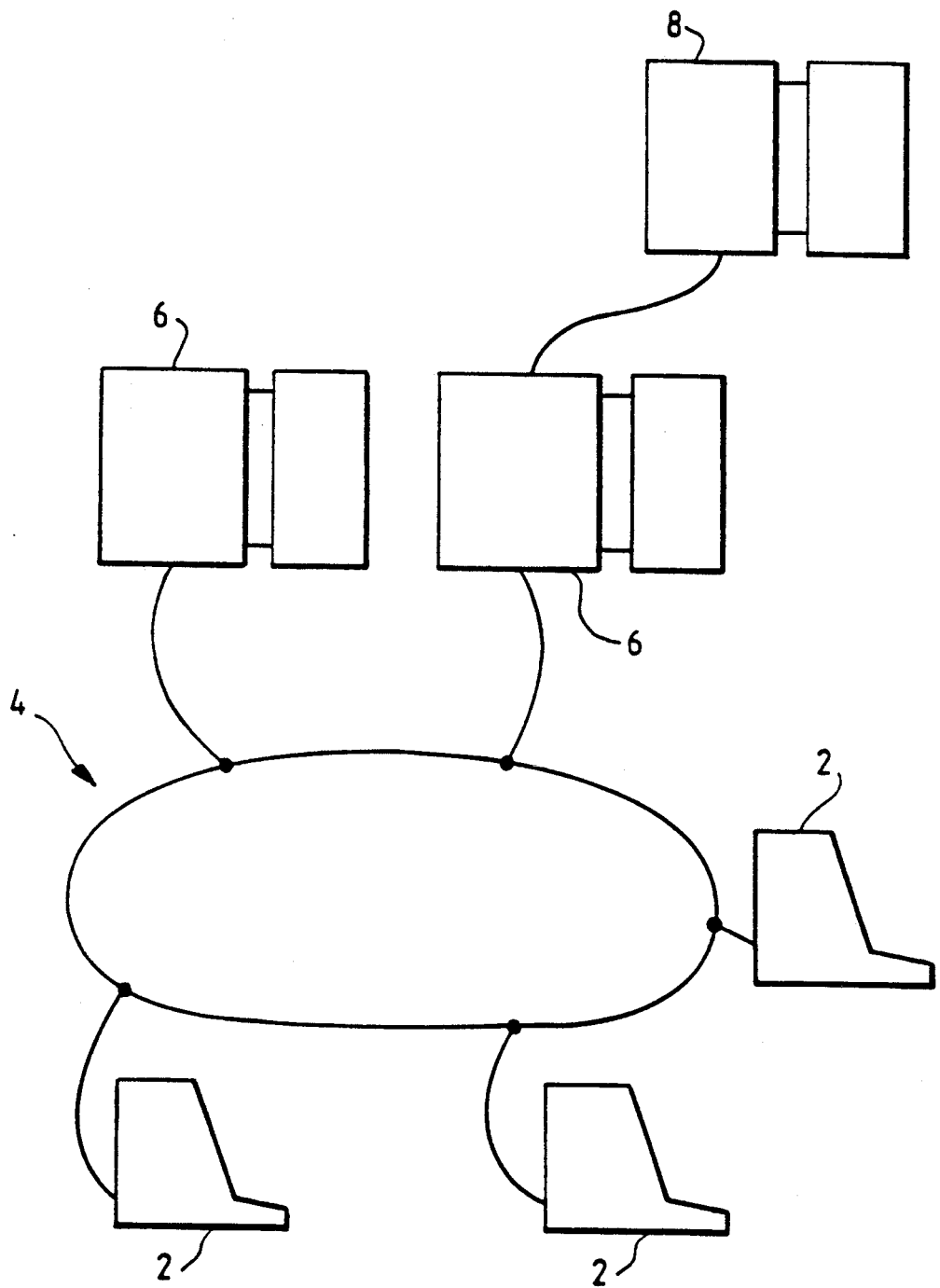

United States Patent [19]
Halliwell

[11] Patent Number: 5,276,883
[45] Date of Patent: Jan. 4, 1994

[54] SYSTEM AND METHOD FOR UNIFORM CONTROL OF LOCAL AND REMOTE APPLICATIONS IN A DATA PROCESSING NETWORK

[75] Inventor: Harry Halliwell, Winchester, United Kingdom

[73] Assignee: International Business Machines Corporation, Armonk, N.Y.

[21] Appl. No.: 678,296
[22] PCT Filed: Aug. 3, 1989
[86] PCT No.: PCT/GB89/00883
 § 371 Date: Apr. 2, 1991
 § 102(e) Date: Apr. 2, 1991
[87] PCT Pub. No.: WO91/02305
 PCT Pub. Date: Feb. 21, 1991
[51] Int. Cl.⁵ .............................. G06F 9/44
[52] U.S. Cl. ........................ 395/700; 364/DIG. 1; 364/280; 364/286; 364/286.3; 364/284; 364/229; 364/232.3
[58] Field of Search ............... 395/200, 700, 650, 600

[56] References Cited

U.S. PATENT DOCUMENTS

| | | | |
|---|---|---|---|
| 4,079,449 | 3/1978 | Mercurio et al. | 364/200 |
| 4,550,386 | 10/1985 | Hirosawa et al. | 364/900 |
| 4,587,630 | 5/1986 | Straton et al. | 364/900 |
| 4,598,384 | 7/1986 | Shaw et al. | 364/900 |
| 4,653,020 | 3/1987 | Cheselka et al. | 364/900 |

FOREIGN PATENT DOCUMENTS 0273248 7/1988 European Pat. Off. .

OTHER PUBLICATIONS

R. W. Scheifler et al., "X Window System", 1988, Digital Press, pp. XVII-XXIX.
I. McCartney, "Xcellence in Windows: Advantages of a Standard", Mini-Micro Systems, vol. XX, No. 7, Jul. 1987, pp. 139-141.
M. Seither, "GSS Opens X Window System for XENIX-Based 386 Workstations", Mini-Micro Systems, vol. XX, No. 7, Jul. 1987, pp. 23-24.

Primary Examiner—Kevin A. Kriess
Attorney, Agent, or Firm—Wayne P. Bailey

[57] ABSTRACT

A workstation and data processing network in which having an application selection mode simultaneously displaying representations of both local and remote applications from which either remote or local applications may be started using a common selection procedure. When a remote application is selected a surrogate application is run on the workstation which establishes a communication with the remote processor. The provision of this common selection procedure means that the workstation is easier to use.

18 Claims, 3 Drawing Sheets

SYSTEM AND METHOD FOR UNIFORM CONTROL OF LOCAL AND REMOTE APPLICATIONS IN A DATA PROCESSING NETWORK

This application is the national phase of international application PCT/GB89/00883, having an international filing data of Aug. 3, 1989.

This invention relates to the field of workstations, data processing networks containing workstations and to methods of operating workstations and data processing networks. More particularly, this invention relates to workstations and data processing networks using which a user may carry out data processing using local or remote applications.

There is a trend in computing to link data processors together to form data processing networks. The processors within such networks may share resources such as data storage devices or communications equipment and may also share the data processing load. Typically, each user has his own intelligent workstation which is connected to one or more mainframe computer systems.

Certain data processing applications, such as those that require a large amount of user interaction, will be best suited to being carried out locally by the local processor of the user's workstation. Other data processing applications, such as those that require a large amount of numeric processing or have shared data, will be best suited to being carried out by the remote processor of a mainframe computer system. Still further applications may be best carried out by being partially processed by the local processor and partially by the remote processor.

With the ever increasing use of computer systems by nonexperts it is desirable that the systems be as simple as possible to use.

Viewed from one aspect the present invention provides a workstation with a local processor for running local applications and a communication system for linking said workstation to at least one remote processor for running remote applications characterised in that said workstation provides an application selection mode for a user in which representations of both local and remote applications are simultaneously displayed at said workstation and when a remote application is selected by said user a surrogate application running on said local processor establishes communication with said remote processor via said communication system, whereby selection of a remote application may be made in the same manner as selection of a local application.

The present invention thus both recognises and overcomes the problem of the additional complexity for the user that has previously been associated with workstations capable of running both local and remote applications. Prior art workstations have required that the user should start local and remote applications in different ways. The invention provides a system which has the advantage of being easier to use than prior art systems by providing a single mode and display from which all the different sorts of application may be started. Accordingly, the user need not be aware whether the application selected is local or remote and may run a plurality of such local and remote applications at any one time.

The present invention provides this function using a surrogate application which is run by the local processor when a remote application is selected. The fact that the surrogate application is run on the workstation means that the surrogate application can start running on the workstation in the same manner as a normal local application. Once the surrogate application has been activated it will undertake the necessary steps (e.g. by keystroke emulation) to activate the required remote application.

There are prior art systems in which the user may select between one of a number of different local applications by highlighting a local application name from a list of local application names. Such systems provide a way of starting local applications that is particularly easy for the user to understand and remember.

There are other prior art systems in which the user can gain access to a remote processor by entering an abbreviated title for that remote processor. These systems operate by automatically emulating the keystrokes that the user needs to provide to gain access to that remote processor and start the remote application running. These prior art systems thus automatically provide the information such as the electronic address of the remote processor, the user's identification number and the user's password.

There have been no prior art systems in which it has been possible to select both local and remote applications from a single application selection mode in which representations of the applications are displayed.

In preferred embodiments of the present invention said communication system enables access by said workstation to a plurality of remote applications. This feature of providing a communication system capable of communicating with more than one remote application at a time has a synergistically advantageous effect when combined with the present invention. This feature means there is no need to treat remote applications differently from local applications by having to make sure that only a single remote application is running at any one time.

Another feature of preferred embodiments of the present invention is that said workstation provides a common selection procedure for starting both local and remote applications. This feature leads to the advantage that the user need only know one procedure (e.g. highlighting the desire application by manipulating a mouse) to start both sorts of application.

It will be appreciated that the representations of the applications could take a number of forms such as icons. However, a further feature of preferred embodiments of the present invention is that said common selection procedure comprises said user selecting an application from a list of applications presented to said user. Extending this procedure of selecting local applications to also include remote applications has the advantage that the users are already familiar with this way of interacting with a computer system thereby allowing less expert users easy access to remote applications. The extension of this selection procedure to remote applications is made possible by the present invention's use of a surrogate application.

The present invention is particularly useful for use with systems using display windows. Display windows are areas of the display though which a particular application or function communicates with the user. Usually, the size and position of the windows within the displays may be varied by the user and the windows may be overlapped. Such systems provide a clear and easy to understand way in which a user may interact with a multitasking system. The present invention when combined with a windowing display provides a system for running both local and remote applications in which the user is sheltered from complications arising from the use of remote applications and provided with a simple user interface for interacting with the applications.

Viewed from a second aspect the present invention provides a method of operating a workstation having a local processor for running local applications and a communication system for linking said workstation to at least one remote processor for running remote applications characterised in that said workstation provides an application selection mode for a user in which representations of both local and remote applications are simultaneously displayed at said workstation and upon selection of a remote application by said user a surrogate application running on said local processor establishes communication with said remote processor via said communication system, whereby selection of a remote application may be made in the same manner as selection of a local application.

The present invention can also be viewed as a data processing network having workstations with the above features and a method of operating such a data processing network.

An embodiment of the invention will now be described, by way of example only, with reference to the accompanying drawing in which:

FIG. 1 schematically illustrates an data processing network of the type in which the present invention may be embodied.

Figure 2:
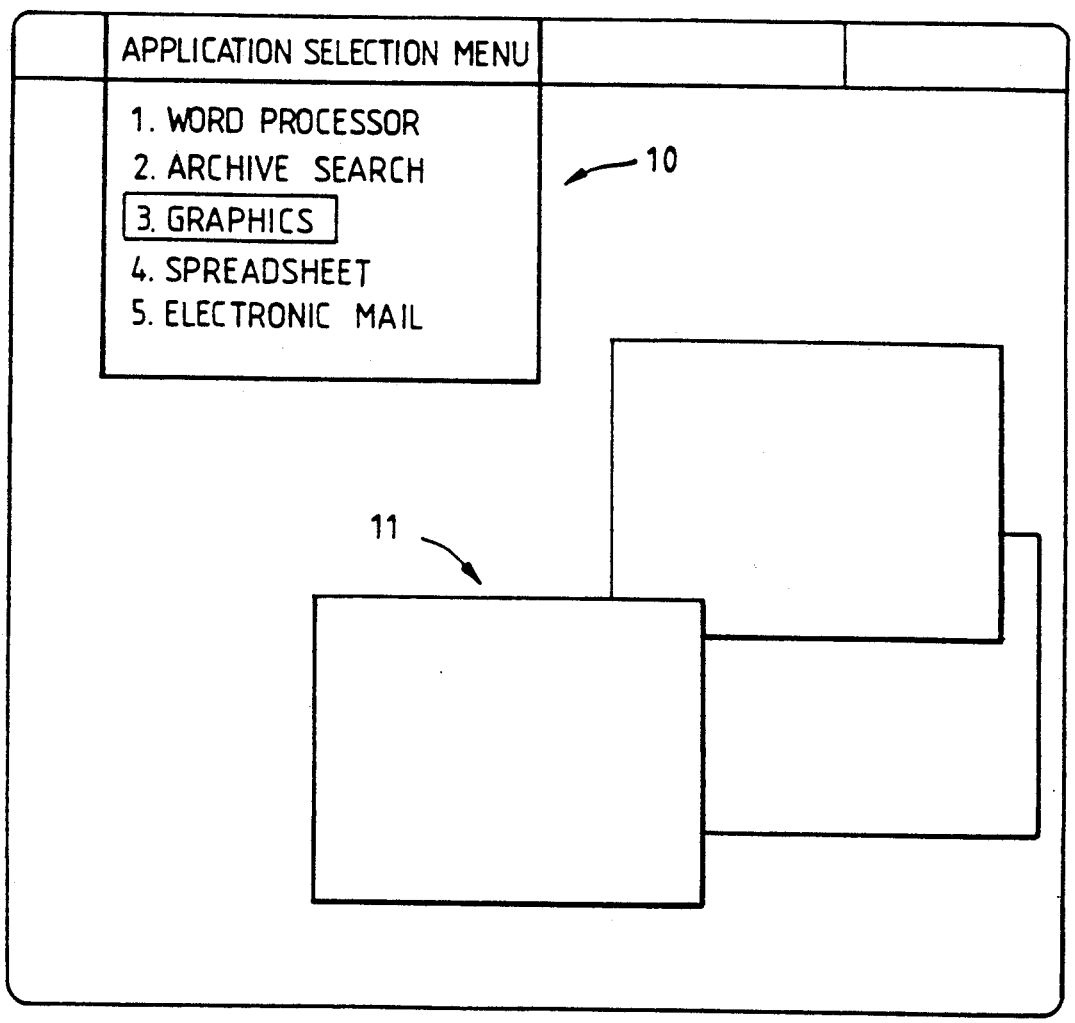

FIG. 2 schematically illustrates an application selection mode and common selection procedure which can be used for both local and remote applications.

Figure 3:
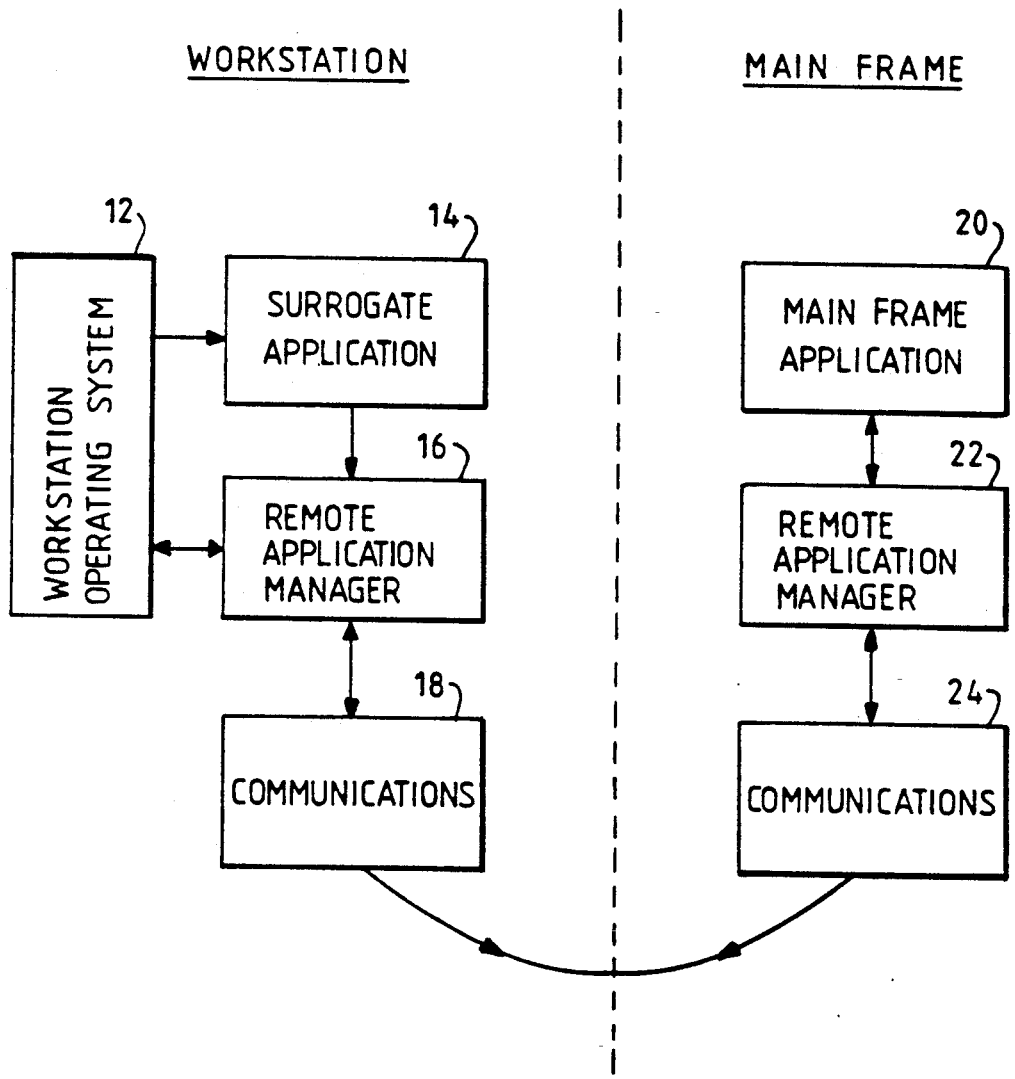

FIG. 3 schematically illustrates the software structure of a program implementation of the present invention.

FIG. 1 shows a data processing network comprising a plurality of workstations (2) which are directly connected via a communication system (4) to a plurality of mainframe computers (6). The workstations may also be indirectly connected to other mainframe computers (8) via the mainframe computers (6) to which they are directly connected.

The workstations (2) contain local processors for running local applications and the mainframe computers (6, 8) contain remote processors for running remote applications. It will also be clearly appreciated that an application may be distributed between local and remote processors in the sense that some of the applications functions (e.g. user interaction) are carried out locally whereas other functions (e.g. large scale numeric processing) are carried out remotely. When such a distributed application is started by a single selection it has the effect of starting both the local part application and the remote part of the application. The remote part of such a distributed application can be started in the same manner as an application that is entirely remote.

FIG. 2 illustrates a selection procedure for selecting both local and remote applications. The workstation (2) displays the application selection menu (10) in the form of a pop down menu. The display also includes a number or overlapping windows (11) through which the user interacts with the various applications being run. The use of windows as a way of displaying information is well understood by users.

The application selection menu (10) presents a list of applications available to the user. Some of these applications, such as the word processor and spreadsheet, run on the local processor of the workstation (2), some, such as graphics and archive search, will run on the remote processor of a mainframe (6, 8), whereas applications such as electronic mail will run on both the local and remote processors.

The user selects an application from the list by using a mouse or manipulating the cursor keys to change the application highlighted to that which the user wishes to start. FIG. 2 shows the graphics application highlighted. When the correct application is highlighted the user can press the appropriate button on the mouse or press the return key on the keyboard to select that application and start it running.

FIG. 3 illustrates the software structure of an embodiment of the present invention. It will be appreciated by those skilled in the art that the individual software elements can be defined in many different ways and programmed in many different computer languages. What is important is the functions performed by the various software elements and the detailed coding of these elements is a matter of routine. It will also be clear that alternative software structures are possible.

The workstation (2) is controlled by an operating system (12) which is of the multitasking windowing type. The workstation also holds a surrogate application (14), a workstation remote application manager (16) and workstation communications program (18). The mainframe (6, 8) holds the mainframe application (20), which may wholly reside on the mainframe or be the mainframe part of a distributed application. The mainframe (6, 8) also holds a mainframe remote application manager (22) and mainframe communications program (24).

The communications programs (18, 24) are responsible for packaging, sending, receiving and checking the information flowing between the workstation (2) and the mainframe (6,8). Programs for performing the functions of the communication handler are known in the art. The workstation remote application manager (16) is responsible for responding to the surrogate applications (14) request to start the remote application and passing messages to and from the remote application once it is started. The mainframe communications program (24) performs essentially the same function as the workstation communications program (18) and the mainframe remote application manager (22) is responsible for starting the mainframe application (20) and routing messages to and from it. The remote application managers (16, 22) are also responsible for ensuring that the routing of messages to and from the appropriate application is maintained when more than one remote application is being run at any one time.

The system operates in the following manner. When a user selects a remote application the workstation operating system (12) starts the surrogate application (14). The surrogate application (14) determines the appropriate electronic address, user identifier and password for that user on the mainframe (6, 8) that runs the requested remote application from a lookup table and passes these to the workstation remote application manager (16). The workstation communications program then establishes communication with the appropriate mainframe (6, 8) using the data passed to it by the workstation remote application handler (16). There are many known different protocols and instructions that the workstation communication handler (16) may use to establish communication and these need not be described in detail.

In the mainframe (6, 8) the mainframe communications program (24) receives the messages from the host and passes them to the mainframe remote application manager (22). The mainframe remote application manager (22) then starts the appropriate mainframe application (20) by, for example, passing the remote application the appropriate initialising parameters. Once the mainframe application (20) has been started the surrogate application is no longer required and the flow of information takes place directly along the chain formed by the other software elements.

What is claimed is:

1. A workstation with a local processor for running local applications and a communication system for linking said workstation to at least one remote processor for running remote applications characterised in that said workstation provides display means for simultaneously displaying representations of both local and remote applications; selection means for selecting at least one of said representations; and invocation means for invoking a surrogate application running on said local processor, said surrogate application comprising means for establishing communication with said remote processor via said communication system.

2. A workstation as claimed in claim 1, wherein said communication system comprises means for enabling access by said workstation to a plurality of remote applications.

3. A workstation as claimed in claim 1, wherein said workstation further comprises means for providing a common selection procedure for starting both local and remote applications.

4. A workstation as claimed in claim 3, wherein said means for providing a common selection procedure comprises means for selecting an application from a list of applications presented to a user.

5. A workstation as claimed in claim 1, further comprising a display means for displaying windows.

6. A data processing network comprising a workstation with a local processor for running local applications and a communication system for linking said workstation to at least one remote processor for running remote applications characterised in that said workstation provides:

display means for simultaneously displaying representations of both local and remote applications;
   selection means for selecting at least one of said representations; and
   invocation means for invoking a surrogate application running on said local processor, said surrogate application comprising means for establishing communication with said remote processor via said communication system.

7. A method of operating a workstation having a local processor for running local applications and a communication system for linking said workstation to at least one remote processor for running remote applications, comprising the steps of: displaying an application selection mode by said workstation in which representations of both local and remote applications are simultaneously displayed; and running a surrogate application, in response to a remote application being selected, on said local processor to establish communication with said remote processor via said communication system.

8. A method of operating a data processing network including a workstation having a local processor for running local applications and a communication system for linking said workstation to at least one remote processor for running remote applications, comprising the steps of:

displaying an application selection mode in which representations of both local and remote applications are simultaneously displayed;
   and running a surrogate application, in response to a remote application being selected, on said local processor to establish communication with said remote processor via said communication system.

9. A workstation as claimed in claim 2, wherein said workstation further comprises means for providing a common selection procedure for starting both local and remote applications.

10. A workstation as claimed in claim 9 wherein said means for providing a common selection procedure comprises means for selecting an application from a list of applications presented to a user.

11. A workstation as claimed in claim 2 further comprising a display means for displaying windows.

12. A workstation as claimed in claim 3 further comprising a display means for displaying windows.

13. A workstation as claimed in claim 4 further comprising a display means for displaying windows.

14. A workstation as claimed in claim 9 further comprising a display means for displaying windows.

15. A data processing network having a workstation as claimed in claim 6, wherein said communication system comprises means for enabling access by said workstation to a plurality of remote applications.

16. A data processing network having a workstation as claimed in claim 6, wherein said workstation further comprises means for providing a common selection procedure for starting both local and remote applications.

17. A data processing network having a workstation as claimed in claim 16, wherein said means for providing a common selection procedure comprises means for selecting an application from a list of applications presented to a user.

18. A data processing network having a workstation as claimed in claim 6, further comprising a display means for displaying windows.

* * * * *